US010181285B2

(12) United States Patent
Im

(10) Patent No.: US 10,181,285 B2
(45) Date of Patent: Jan. 15, 2019

(54) PIXEL AND ORGANIC LIGHT EMITTING DISPLAY DEVICE HAVING THE SAME

(71) Applicant: SAMSUNG DISPLAY CO., LTD., Yongin-si, Gyeonggi-do (KR)

(72) Inventor: Chang-Jin Im, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 274 days.

(21) Appl. No.: 15/097,157

(22) Filed: Apr. 12, 2016

(65) Prior Publication Data

US 2017/0084220 A1 Mar. 23, 2017

(30) Foreign Application Priority Data

Sep. 23, 2015 (KR) ........................ 10-2015-0134426

(51) Int. Cl.

*G09G 3/20* (2006.01)
*G09G 3/32* (2016.01)
*G06F 3/041* (2006.01)
*G09G 3/3233* (2016.01)

(52) U.S. Cl.

CPC ... *G09G 3/3233* (2013.01); *G09G 2300/0823* (2013.01); *G09G 2300/0852* (2013.01); *G09G 2300/0861* (2013.01); *G09G 2300/0866* (2013.01); *G09G 2310/08* (2013.01); *G09G 2370/08* (2013.01)

(58) Field of Classification Search

CPC ..... G09G 3/041–3/3266; G09G 3/2048; G06F 3/0412

See application file for complete search history.

(56) References Cited

U.S. PATENT DOCUMENTS

| | | | | | |
|---|---|---|---|---|---|
| 3,930,267 | A * | 12/1975 | Plener | G11B 15/10 | 360/137 |
| 2007/0075937 | A1* | 4/2007 | Kim | G09G 3/3233 | 345/76 |
| 2007/0085847 | A1* | 4/2007 | Shishido | G09G 3/3233 | 345/204 |
| 2008/0111804 | A1* | 5/2008 | Choi | G09G 3/3233 | 345/205 |

(Continued)

FOREIGN PATENT DOCUMENTS

KR 10-2015-0052531 A 5/2015

*Primary Examiner* — Lin Li

(74) *Attorney, Agent, or Firm* — Lewis Roca Rothgerber Christie LLP

(57) ABSTRACT

A pixel of an organic light emitting display device includes an organic light emitting diode, a driving transistor including a gate electrode coupled to a first node, a first electrode coupled to a second node, and a second electrode coupled to a third node, the driving transistor being configured to control a driving current through the organic light emitting diode based on a voltage of the first node, a first transistor coupled between the second node and a data line, the first transistor being configured to be turned on in response to a scan signal provided through a current scan line, a storage capacitor coupled between the first node and a high-power voltage line, the storage capacitor being configured to store a data signal provided through the first transistor, and an initialization block configured to initialize the first node based on a scan signal provided through a previous scan line.

18 Claims, 7 Drawing Sheets

(56) References Cited

U.S. PATENT DOCUMENTS

| | | | | |
|---|---|---|---|---|
| 2010/0177024 | A1* | 7/2010 | Choi | G09G 3/3233 345/76 |
| 2013/0127924 | A1* | 5/2013 | Lee | G09G 3/32 345/690 |
| 2013/0215158 | A1* | 8/2013 | Fujita | G09G 3/3233 345/690 |
| 2014/0084805 | A1* | 3/2014 | Kim | G09G 3/2048 315/228 |
| 2014/0333512 | A1* | 11/2014 | In | G09G 3/3233 345/76 |
| 2015/0318783 | A1* | 11/2015 | Suetake | H02M 3/07 307/110 |
| 2015/0379929 | A1* | 12/2015 | Zhai | G09G 3/3233 345/78 |
| 2016/0246422 | A1* | 8/2016 | Tan | G06F 3/0412 |
| 2017/0337875 | A1* | 11/2017 | Jeon | G09G 3/3258 |

* cited by examiner

PIXEL AND ORGANIC LIGHT EMITTING DISPLAY DEVICE HAVING THE SAME

CROSS-REFERENCE TO RELATED APPLICATION

This application claims priority to, and the benefit of, Korean Patent Application No. 10-2015-0134426, filed on Sep. 23, 2015 in the Korean Intellectual Property Office (KIPO), the contents of which are incorporated herein in their entirety by reference.

BACKGROUND

1. Field

Example embodiments of the present invention relate generally to a pixel, and a display device having the same.

2. Description of the Related Art

Flat panel display (FPD) devices are widely used in electronic devices, because FPD devices are relatively light-weight and thin when compared to cathode-ray tube (CRT) display devices. Examples of FPD devices are liquid crystal display (LCD) devices, field emission display (FED) devices, plasma display panel (PDP) devices, and organic light emitting display (OLED) devices. OLED devices have been spotlighted as next-generation display devices, because the OLED devices have various aspects, such as a wide viewing angle, a rapid response speed, a thin thickness, low power consumption, etc.

An initialization voltage may be provided to a pixel in the organic light emitting display device before a data voltage is programmed to thereby provide uniform current to an organic light emitting diode of the pixel. An initialization power, and an initialization power line through which the initialization voltage is provided to the pixel, may be used. Thus, spatial limitations may occur in a pixel layout of the pixel.

SUMMARY

Some example embodiments of the present invention provide a pixel of an organic light emitting display device that is capable of initializing the pixel without an initialization power and an initialization power line.

Some example embodiments of the present invention provide an organic light emitting display device capable of initializing a pixel without an initialization power and an initialization power line.

According to an aspect of example embodiments, a pixel of an organic light emitting display device includes an organic light emitting diode, a driving transistor including a gate electrode coupled to a first node, a first electrode coupled to a second node, and a second electrode coupled to a third node, the driving transistor being configured to control a driving current through the organic light emitting diode based on a voltage of the first node, a first transistor coupled between the second node and a data line, the first transistor being configured to be turned on in response to a current scan signal provided through a current scan line, a storage capacitor coupled between the first node and a high-power voltage line, the storage capacitor being configured to store a data signal provided through the first transistor, and an initialization block configured to initialize the first node based on a previous scan signal provided through a previous scan line.

The initialization block may include a diode including an anode electrode coupled to the first node, and a cathode electrode coupled to a fourth node, a first capacitor coupled between the previous scan line and the fourth node, and a second capacitor coupled between the high-power voltage line and the fourth node.

A high-power voltage may be configured to be provided through the high-power voltage line and applied to the fourth node by being divided by the first capacitor and the second capacitor when the previous scan signal is provided through the previous scan line.

A current may be configured to flow from the first node to the fourth node through the diode when a voltage level of the first node is higher than a voltage level of the fourth node.

The pixel may further include a second transistor coupled between the first node and the third node, the second transistor being configured to be turned on in response to the current scan signal provided through the current scan line, and the second transistor may form a path through which a data signal is configured to be provided through the data line and stored in the storage capacitor.

The pixel may further include a third transistor coupled between the high-power voltage line and the second node, and a fourth transistor coupled between the third node and the organic light emitting diode.

A frame of the pixel may include a first period in which the first node is configured to be initialized, a second period in which the data signal is configured to be stored in the storage capacitor, and a third period in which the organic light emitting diode is configured to emit light.

The driving transistor and the first transistor may be configured to be turned on, and the initialization block may be configured to be operated, in the first period.

The driving transistor and the first transistor may be configured to be turned on, and the initialization block may be configured to be not operated, in the second period.

The driving transistor may be configured to be turned on, the first transistor may be configured to be turned off, and the initialization block may be configured to be not operated, in the third period.

According to an aspect of example embodiments, a display device includes a display panel including a plurality of scan lines, a plurality of data lines, a plurality of pixels at respective crossing regions of the scan lines and the data lines, a scan driver configured to provide scan signals to the pixels, a data driver configured to provide a data signal to the pixels, and a timing controller configured to generate a control signal that is configured to control the scan driver and the data driver, wherein each of the pixels includes an organic light emitting diode, a driving transistor including a gate electrode coupled to a first node, a first electrode coupled to a second node, and a second electrode coupled to a third node, the driving transistor being configured to control a driving current flowing to the organic light emitting diode based on a voltage of the first node, a first transistor coupled between the second node and the data line, the first transistor being configured to be turned on in response to a current scan signal provided through a current scan line of the scan lines, a storage capacitor coupled between the first node and a high-power voltage line, the storage capacitor being configured to store the data signal provided through the first transistor, and an initialization block configured to initialize the first node based on a previous scan signal provided through a previous scan line of the scan lines.

The initialization block may further include a diode including an anode electrode coupled to the first node, and a cathode electrode coupled to a fourth node, a first capacitor coupled between the previous scan line and the fourth node, and a second capacitor coupled between the high-power voltage line and the fourth node.

A high-power voltage may be configured to be provided through the high-power voltage line and applied to the fourth node by being divided by the first capacitor and the second capacitor when the previous scan signal is provided through the previous scan line.

A current may be configured to flow from the first node to the fourth node through the diode when a voltage level of the first node is higher than a voltage level of the fourth node.

The pixel may further include a second transistor coupled between the first node and the third node, the second transistor being configured to be turned on in response to the current scan signal provided through the current scan line, and the second transistor may form a path through which the data signal provided through the data line is configured to be stored in the storage capacitor.

Each of the pixels may further include a third transistor coupled between the high-power voltage line and the second node, and a fourth transistor coupled between the third node and the organic light emitting diode.

A frame of each of the pixels may include a first period in which the first node is configured to be initialized, a second period in which the data signal is configured to be stored in the storage capacitor, and a third period in which the organic light emitting diode is configured to emit light.

The driving transistor and the first transistor may be configured to be turned on, and the initialization block may be configured to be operated, in the first period.

The driving transistor and the first transistor may be configured to be turned on, and the initialization block may be configured to be not operated, in the second period.

The driving transistor may be configured to be turned on, the first transistor may be configured to be turned off, and the initialization block may be configured to be not operated, in the third period.

Therefore, a pixel and an organic light emitting display device allow a pixel layout of an organic light emitting display device to be simplified by initializing a driving transistor included in the pixel without an initialization power or an initialization power line.

BRIEF DESCRIPTION OF THE DRAWINGS

Illustrative, non-limiting example embodiments of the present invention will be more clearly understood from the following detailed description, taken in conjunction with the accompanying drawings, wherein.

DETAILED DESCRIPTION

Figure 1:
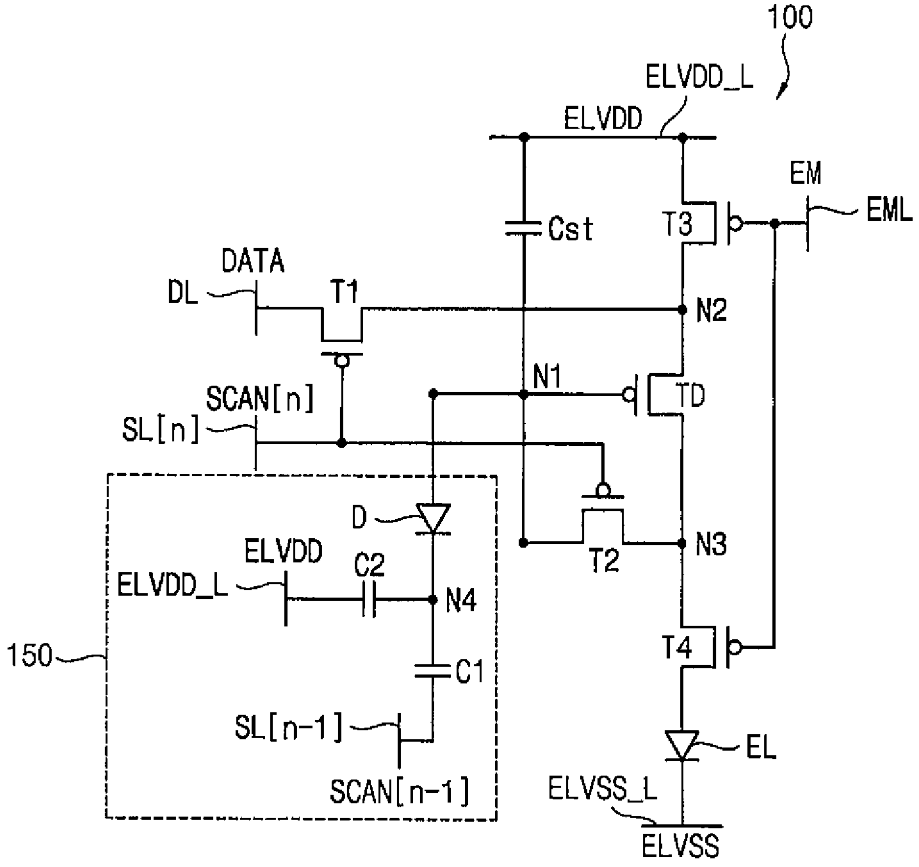
FIG. 1 is a circuit diagram illustrating a pixel of an organic light emitting display device according to example embodiments.

Features of the inventive concept and methods of accomplishing the same may be understood more readily by reference to the following detailed description of embodiments and the accompanying drawings. Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. In addition, it will also be understood that when an element or layer is referred to as being "between" two elements or layers, it can be the only element or layer between the two elements or layers, or one or more intervening elements or layers may also be present.

In the following examples, the x-axis, the y-axis and the z-axis are not limited to three axes of a rectangular coordinate system, and may be interpreted in a broader sense. For example, the x-axis, the y-axis, and the z-axis may be perpendicular to one another, or may represent different directions that are not perpendicular to one another.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a circuit diagram illustrating a pixel of an organic light emitting display device according to example embodiments.

Referring to FIG. 1, a pixel 100 of an organic light emitting display device according to example embodiments of the present invention may include an organic light emitting diode EL, a driving transistor TD, a first transistor T1, a storage capacitor Cst, and an initialization block 150.

An anode electrode of the organic light emitting diode EL may be coupled to a second electrode of a fourth transistor T4. A cathode electrode of the organic light emitting diode EL may be coupled to a low-power voltage line ELVSS_L that provides a low-power voltage ELVSS. The organic light emitting diode EL may emit light based on a driving current flowing through the driving transistor TD. Specifically, a light emitting amount of the organic light emitting diode EL may be proportional to a current flowing between a drain electrode and a source electrode of the driving transistor TD.

A gate electrode of the driving transistor TD may be coupled to a first node N1. A first electrode of the driving transistor TD may be coupled to a second node N2. A second electrode of driving transistor TD may be coupled to a third node N3. The driving transistor TD may control the driving current flowing through the organic light emitting diode EL based on a voltage at the first node N1. That is, the driving transistor TD may control the driving current based on a voltage of the gate electrode of the driving transistor TD. The driving transistor TD may be operated in a dynamic range. The dynamic range may have voltage levels that operate the driving transistor TD. For example, the dynamic range may include a voltage level that is higher than a voltage level that generates the driving current to display a white color image on the display panel, and may include a voltage level that is lower than a voltage level that generates the driving current to display a black color image on the display panel.

The first transistor T1 may be coupled between the second node N2 and a data line DL. The first transistor T1 may turn on in response to a scan signal (e.g., a current scan signal) SCAN[n] of a current scan line SL[n]. The data signal DATA provided through the data line DL may be provided to the second node N2 through the first transistor T1. The pixel 100 of FIG. 1 may further include a second transistor T2 coupled between the first node N1 and the third node N3.

The second transistor T2 may turn on in response to the scan signal SCAN[n] of the current scan line SL[n]. The second transistor T2 may form a path through which the data signal DATA provided through the data line DL is stored in the storage capacitor Cst. The data signal DATA provided through the data line DL may be stored in the storage capacitor Cst when the first transistor T1 and the second transistor T2 turn on in response to the scan signal SCAN[n] of the current scan line SL[n].

The storage capacitor Cst may be coupled between the first node N1 and a high-power voltage line ELVDD_L (e.g., to receive a high-power voltage ELVDD). The storage capacitor Cst may store the data signal DATA provided through the first transistor T1 and the second transistor T2.

The initialization block 150 may initialize the first node N1 based on a scan signal (e.g., a previous scan signal) SCAN[n−1] of a previous scan line SL[n−1]. For example, the initialization block 150 may include a diode D, a first capacitor C1, and a second capacitor C2. An anode electrode of the diode D may be coupled to the first node N1. A cathode electrode of the diode D may be coupled to a fourth node N4. The diode D may be coupled between the first node N1 and the fourth node N4. A current may flow, or might not flow, through the diode D based on the voltage of the first node N1 and a voltage of the fourth node N4.

The first capacitor C1 may be coupled between the previous scan line SL[n−1] and the fourth node N4. The second capacitor C2 may be coupled between the high-power voltage line ELVDD_L and the fourth node N4. The high-power voltage ELVDD provided through the high-power voltage line ELVDD_L may be provided to the fourth node N4 by being divided by the first capacitor C1 and the second capacitor C2 when the scan signal SCAN[n−1] is provided through the previous scan line SL[n−1]. The voltage of the fourth node N4 may have a voltage level that is lower than the dynamic range because of the first capacitor C1 and the second capacitor C2. In this case, the diode D may turn on. The voltage of the first node N1 may be reduced under the dynamic range by electrically coupling the first node N1 to the fourth node N4. Here, the first capacitor C1 and the second capacitor C2 may have values that reduce the voltage of the first node N1 under the dynamic range.

The pixel 100 of FIG. 1 may further include a third transistor T3 and the fourth transistor T4. The third transistor T3 may be coupled between the high-power voltage line ELVDD_L and the second node N2. The third transistor T3 may turn on in response to an emission signal EM provided through an emission line EML.

The fourth transistor T4 may be coupled between the third node N3 and the organic light emitting diode EL. The fourth transistor T4 may turn on in response to the emission signal EM provided through the emission line EML. The driving current flowing through the driving transistor TD may be provided to the organic diode EL when the third transistor T3 and the fourth transistor T4 turn on. The organic light emitting diode EL may light emit based on the driving current.

As described above, the pixel 100 of FIG. 1 may include the initialization block 150. The initialization block 150 may initialize the first node N1 coupled to the gate electrode of the driving transistor TD. That is, the initialization block 150 may reduce the voltage of the first node N1 under the dynamic range. Thus, the gate electrode of the driving transistor TD may be initialized without an initialization power or an initialization power line.

Although the pixel 100 in FIG. 1 is described as having P-channel Metal Oxide Semiconductor (PMOS) transistors, the pixel 100 is not limited thereto. For example, the pixel 100 may instead have N-channel Metal Oxide Semiconductors (NMOS).

A frame of the pixel 100 may include a first period in which the first node N1 is initialized, a second period in which the data signal DATA is stored in the storage capacitor Cst, and a third period in which the organic light emitting diode EL emits light. An operation of the pixel 100 in the first period, the second period, and the third period is described in FIGS. 2 through 4.

Figure 2:
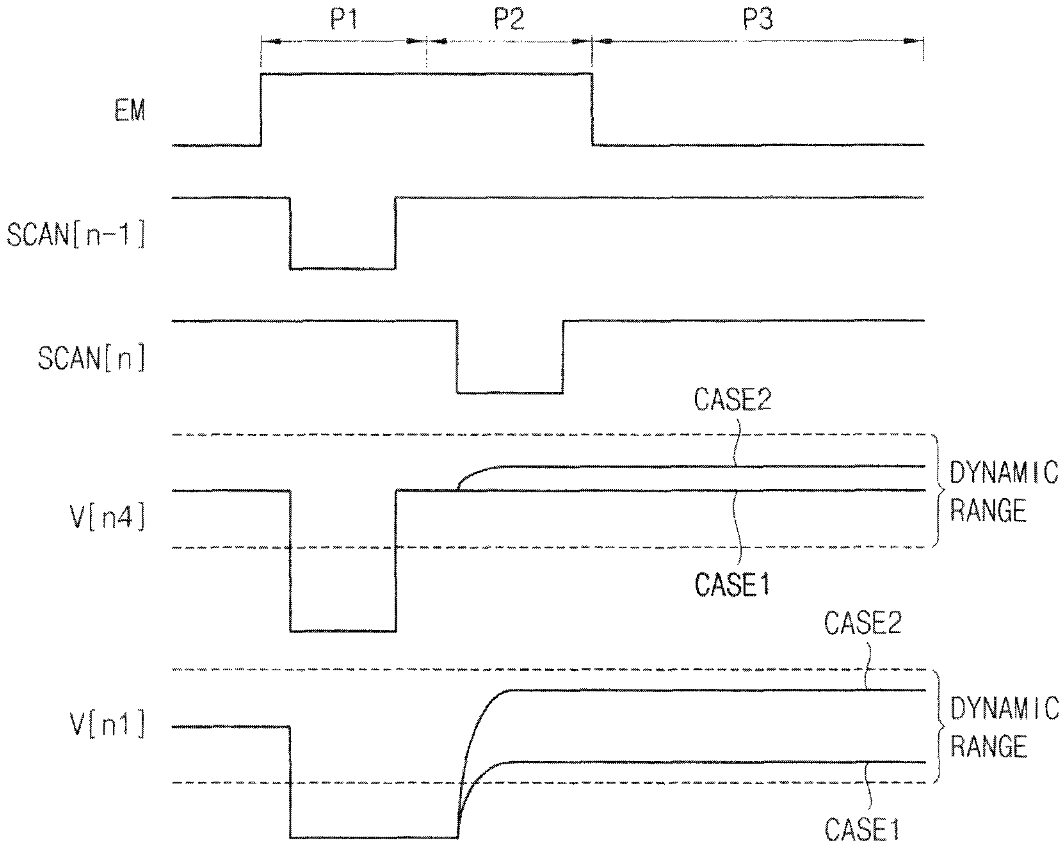
FIG. 2 is a timing diagram for describing an operation of the pixel of FIG. 1.

FIG. 2 is a timing diagram for describing an operation of the pixel of FIG. 1 and FIGS. 3A through 3C are circuit diagrams for describing an operation of the pixel of FIG. 1.

Referring to FIG. 2, a frame of a pixel 200 may include a first period P1, a second period P2, and a third period P3. A first node N1 of the pixel 200 may be initialized in the first period P1. A data signal DATA may be stored in a storage capacitor Cst of the pixel 200 in the second period P2. An organic light emitting diode EL of the pixel 200 may emit light in the third period P3.

Figure 3A:
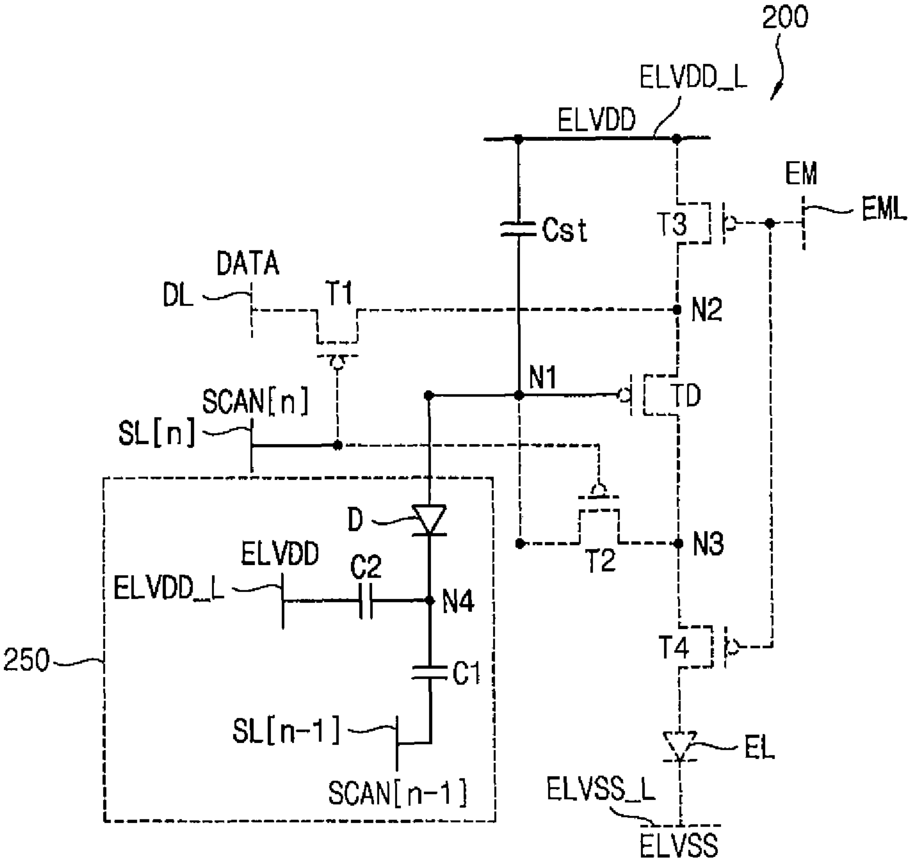
FIGS. 3A through 3C are circuit diagrams for describing an operation of the pixel of FIG. 1.

Referring to FIGS. 2 and 3A, a driving transistor TD of the pixel 200 and a first transistor T1 of the pixel 200 may turn off in the first period P1. An initialization block 250 of the pixel 200 may be operated in the first period P1. Further, a second transistor T2, a third transistor T3, and a fourth transistor T4 may turn off in the first period P1. A scan signal SCAN[n−1] may be provided to a first capacitor C1 coupled to a previous scan line SL[n−1] in the first period P1. A high-power voltage ELVDD may be provided to a second capacitor C2 coupled to a high-power voltage line ELVDD_L. The high-power voltage ELVDD provided to the second capacitor C2 may be divided by the first capacitor C1 and the second capacitor C2. The divided voltage may be applied to a fourth node N4. Here, a fourth voltage V[N4] of the fourth node N4 may have a voltage level that is under the dynamic range. In this case, a diode D of the pixel 200 may be electrically conductive. A first voltage V[N1] may be reduced under the dynamic range by electrically coupling the first node N1 to the fourth node N4. Thus, the first node N1 may be initialized. Here, the first capacitor C1 and the second capacitor C2 may have values that reduce the first voltage V[N1] of the first node N1 under the dynamic range.

Figure 3B:
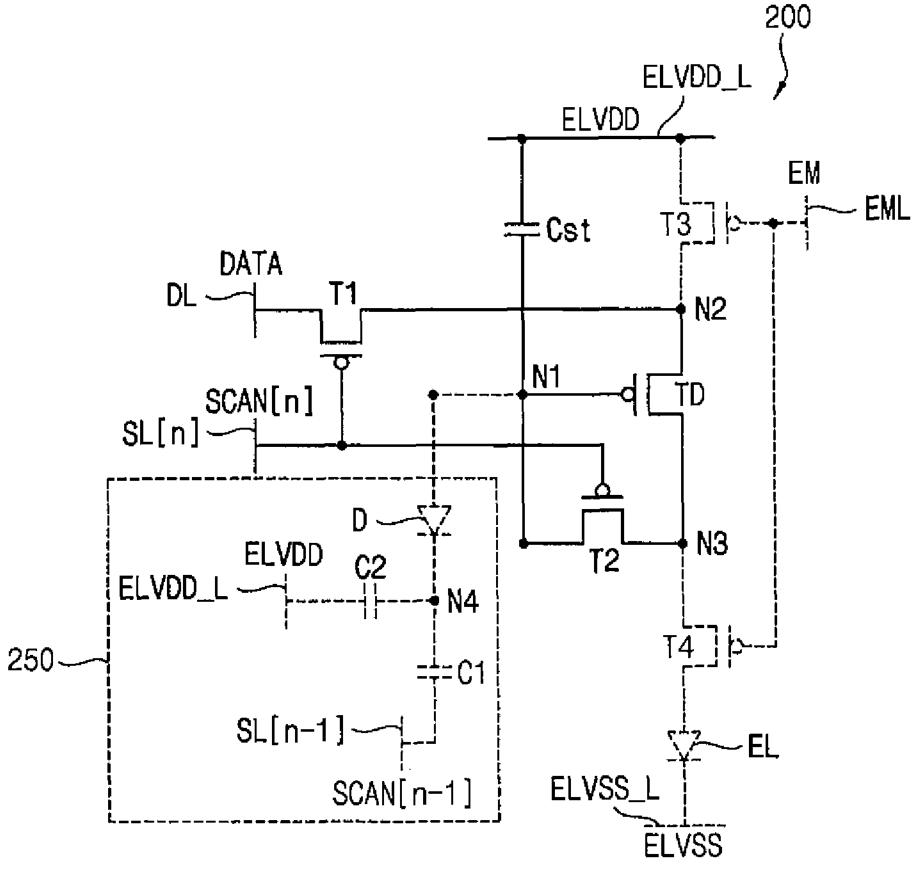

Referring to FIGS. 2 and 3B, the driving transistor TD and the first transistor T1 may turn on in the second period P2. The initialization block 250 might not be operated in the second period P2. Further, the second transistor T2 may turn on in the second period P2. The third transistor T3 and the fourth transistor T4 may be turned off in the second period P2. A scan signal SCAN[n] may be provided to a gate electrode of the first transistor T1, which is coupled to a current scan line SL[n], and may be provided to a gate electrode of the second transistor T2, which is also coupled to the current scan line SL[n], in the second period P2. Thus, the first transistor T1 and the second transistor T2 may turn on in response to the scan signal SCAN[n] provided through the current scan line SL[n] in the second period P2. The first transistor T1 may provide a data signal DATA provided through a data line DL to the first node N1 in the second period P2. The second transistor T2 may form a path through which the data signal DATA provided to the first node N1 is stored in a storage capacitor Cst. Thus, the data signal DATA provided through the data line DL may be stored in the storage capacitor Cst through the first transistor T1, the driving transistor TD, and the second transistor T2 in the second period P2.

The fourth voltage V[N4] of the fourth node N4 may be changed based on the first voltage V[N1] of the first node N1 in the second period P2. In some example embodiments of the present invention, the fourth voltage V[N4] of the fourth node N4 may be maintained when the first voltage V[N1] applied to the first node N1 in the current frame is lower than the first voltage V[N1] applied to the first node N1 in the previous frame, because the diode D is not electrically conductive, and no current flows therethrough (CASE 1). Here, the diode D is not conductive because the first voltage V[N1] of the first node N1 is lower than the fourth voltage V[N4] of the fourth node N4. In other example embodiments of the present invention, the fourth voltage V[N4] of the fourth node N4 may increase when the first voltage V[N1] applied to the first node N1 in the current frame is higher than the first voltage V[N1] applied to the first node N1 in the previous frame, because the fourth node N4 is electrically coupled to the first node N1 via the diode D (CASE 2). The fourth voltage V[N4] might not affect to the initialization of the first node N1 in a next/subsequent frame, because the fourth voltage V[N4] is applied under the dynamic range due to the first capacitor C1 and the second capacitor C2 in the first period P1 of the next/subsequent frame, even though the fourth voltage V[N4] increases in the second period P2 of the current frame.

Figure 3C:
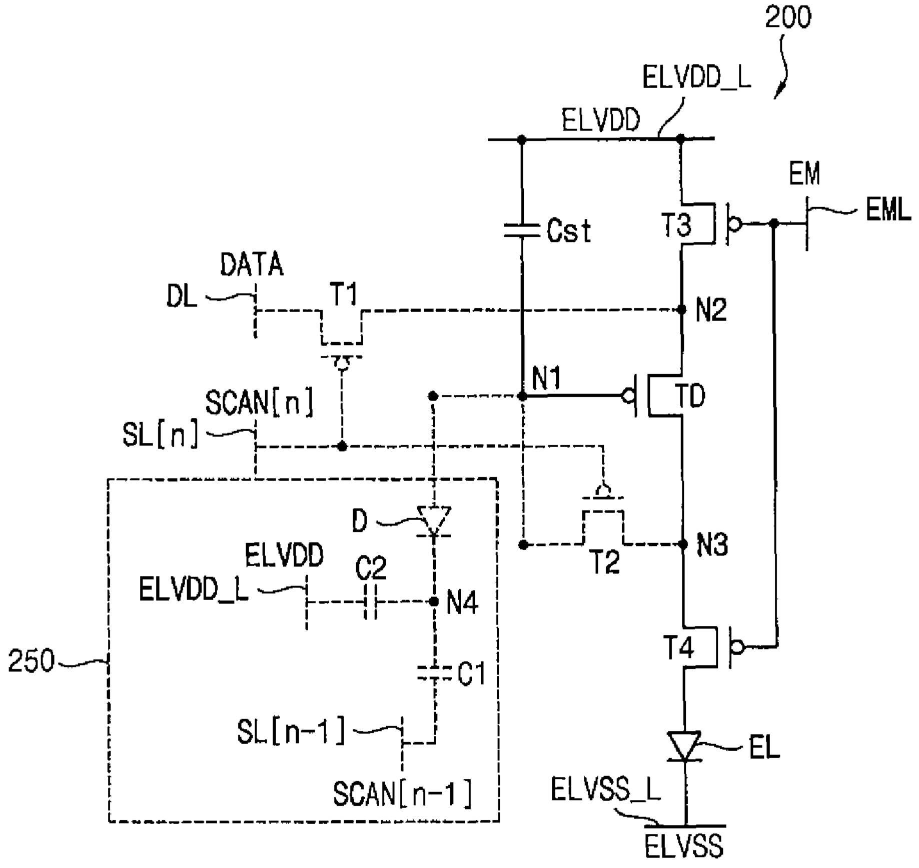

Referring to FIGS. 2 and 3C, the organic light emitting diode EL may emit light in the third period P3. The driving transistor TD may turn on in the third period P3. The first transistor T1 may turn off in the third period P3. The initialization block 250 might not be operated in the third period P3. Further, the third transistor T3 and the fourth transistor T4 may turn on in response to an emission signal EM provided through an emission line EML. The driving transistor TD may be operated because the first voltage V[N1], which is within the dynamic range, is provided to the first node N1, as depicted in FIG. 3C. The driving transistor TD may generate a driving current based on the data signal DATA stored in the storage capacitor Cst. The organic light emitting diode EL may emit light based on the driving current.

As described above, the pixel 200 according to example embodiments may initialize the first node N1 coupled to the gate electrode of the driving transistor TD during the first period P1, may store the data signal DATA during the second period P2, and may emit light from the organic light emitting diode EL during the third period P3. The initialization block 250 may reduce the first voltage V[N1] under the dynamic range by electrically coupling the fourth node N4 of the initialization block 250 and the first node N1. Thus, the gate electrode of the driving transistor TD may be initialized without an initialization power or an initialization power line.

Figure 4:
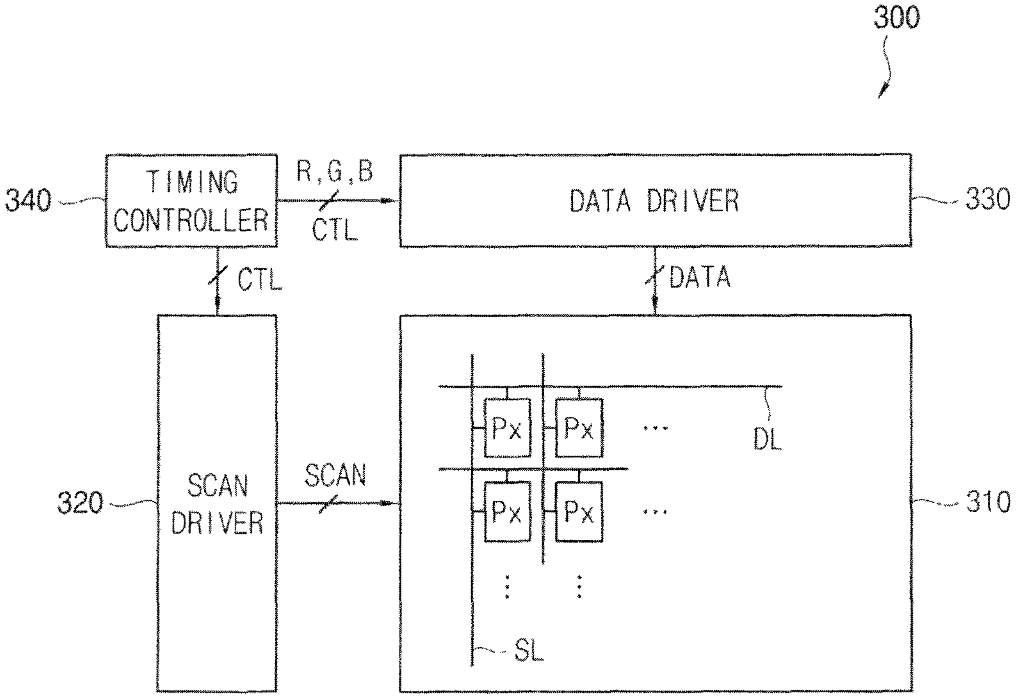
FIG. 4 is a block diagram illustrating an organic light emitting display device according to example embodiments.

FIG. 4 is a block diagram illustrating an organic light emitting display device according to example embodiments.

Referring to FIG. 4, an organic light emitting display device 300 may include a display panel 310, a scan driver 320, a data driver 330, and a timing controller 340.

A plurality of scan lines SL and a plurality of data lines DL may be formed on the display panel 310. A plurality of pixels Px may be formed at respective crossing regions of the scan lines SL and the data lines DL. Here, the pixels Px of FIG. 4 may correspond to the pixel 100 of FIG. 1.

The pixel Px of the organic light emitting display device 300 may include an organic light emitting diode, a driving transistor, a first transistor, a storage capacitor, and an initialization block. An anode electrode of the organic light diode may be coupled to a second electrode of a fourth transistor. A cathode electrode of the organic light diode may be coupled to a low-power voltage line through which a low-power voltage is provided. The organic light emitting diode may emit light based on a driving current flowing through the driving transistor. A gate electrode of the driving transistor may be coupled to a first node, a first electrode of the driving transistor may be coupled to a second node, and a second electrode of the driving transistor may be coupled to a third node. The driving transistor may control the driving current flowing to the organic light emitting diode based on a voltage of the first node. The driving transistor may be operated when a voltage level of the first node is in a dynamic range. A first transistor may be coupled between the second node and the data line DL. The first transistor may turn on in response to a scan signal SCAN of a current scan line SL. The data signal DATA flowing through the data line DL may be provided to the second node when the first transistor turns on. The pixel Px may further include a second transistor coupled between the first node and the third node. The second transistor may turn on in response to the scan signal SCAN of the current scan line SL. The second transistor may form a path through which the data signal DATA is stored in the storage capacitor. The storage capacitor may be coupled between the first node and the high-power voltage line. The storage capacitor may store the data signal DATA provided through the first transistor and the second transistor.

The initialization block may initialize the first node based on the scan signal SCAN of a previous scan line SL. Specifically, the initialization block may include a diode, a first capacitor, and a second capacitor. An anode electrode of the diode may be coupled to the first node. A cathode electrode of the diode may be coupled to a fourth node. The diode may be coupled between the first node and the fourth node. The diode may or may not be electrically conductive based on the voltage of the first node and the voltage of the fourth node. The first capacitor may be coupled between the previous scan line and the fourth node. The second capacitor may be coupled between the high-power voltage line and the fourth node. The high-power voltage provided through the high-power voltage line may be applied to the fourth node by being divided based on the first capacitor and the second capacitor when the scan signal SCAN is provided through the previous scan line. The voltage of the fourth node may be under, or below, the dynamic range. In this case, the diode may be electrically conductive. Thus, the voltage of the first node may be reduced to be below the dynamic range because the first node and the fourth node are electrically coupled by the diode. Here, the first capacitor C1 and the second capacitor C2 may have values that reduce the voltage of the first node N1 to be below the dynamic range.

The pixel Px may further include a third transistor and the fourth transistor. The third transistor may be coupled between the high-power voltage line and the second node. The third transistor may turn on in response to an emission signal provided through the emission line. The fourth transistor may be coupled between the third node and an organic light emitting diode. The fourth transistor may turn on in response to the emission signal. The driving current flowing through the driving transistor may be provided to the organic light emitting diode when the third transistor and the fourth transistor turn on.

A frame of the pixel Px may include a first period, a second period, and a third period. The driving transistor and the first transistor may turn off in the first period. The initialization block may be operated in the first period. Further, the second transistor, the third transistor, and the fourth transistor may turn off in the first period. The scan signal SCAN may be provided to the first capacitor coupled to the previous scan line SL in the first period. The high-power voltage may be provided to the second capacitor coupled to the high-power voltage line. The high-power voltage provided to the second capacitor may be divided by the first capacitor and the second capacitor. The divided voltage may be applied to the fourth node. Here, the voltage level of the fourth node may be below the dynamic range. In this case, the diode may be electrically conductive. The voltage of the first node may be reduced to be below the dynamic range by electrically coupling the first node to the fourth node. Thus, the first node may be initialized. Here, the first capacitor and the second capacitor may have values that reduce the voltage of the first node to be below the dynamic range.

The driving transistor and the first transistor may turn on in the second period. The initialization block might not be operated in the second period. Further, the second transistor may turn on in the second period. The third transistor and the fourth transistor may turn off in the second period. The scan signal SCAN may be provided to the gate electrode of the first transistor, which is coupled to a current scan line SL, and may be provided to a gate electrode of the second transistor, which is also coupled to the current scan line SL in the second period. Thus, the first transistor and the second transistor may turn on in response to the scan signal SCAN provided through the current scan line SL in the second period. Thus, the data signal DATA provided through the data line DL may be stored in the storage capacitor through the first transistor, the driving transistor, and the second transistor in the second period.

The organic light emitting diode may emit light in the third period. The driving transistor may be on in the third period. The first transistor T1 may turn off in the third period. The initialization block might not be operated in the third period. Further, the third transistor and the fourth transistor may turn on in response to an emission signal provided through an emission line. The driving transistor may generate the driving current based on the data signal DATA stored in the storage capacitor. The organic light emitting diode may emit light based on the driving current.

The scan driver 320 may provide the scan signal SCAN to the pixel Px through the scan line SL (e.g., a corresponding one of the scan lines SL), the data driver 330 may provide the data signal DATA to the pixel Px through the data line DL (e.g., a corresponding one of the data lines DL). The timing controller 340 may generate a control signal CTL that controls the scan driver 320 and the data driver 330. The organic light emitting display device 300 may further include an emission control driver.

As described above, the organic light emitting display device 300 may include the display panel 310. The display panel 310 may include pixels Px that change the voltage of the first node coupled to the gate electrode of the driving transistor under the dynamic range by electrically coupling the first node to the fourth node of the initialization block. Thus, a pixel layout of the display panel 310 of the organic light emitting display device 300 may be simplified, because the driving transistor included in the pixel is initialized without an initialization power or an initialization power line.

Figure 5:
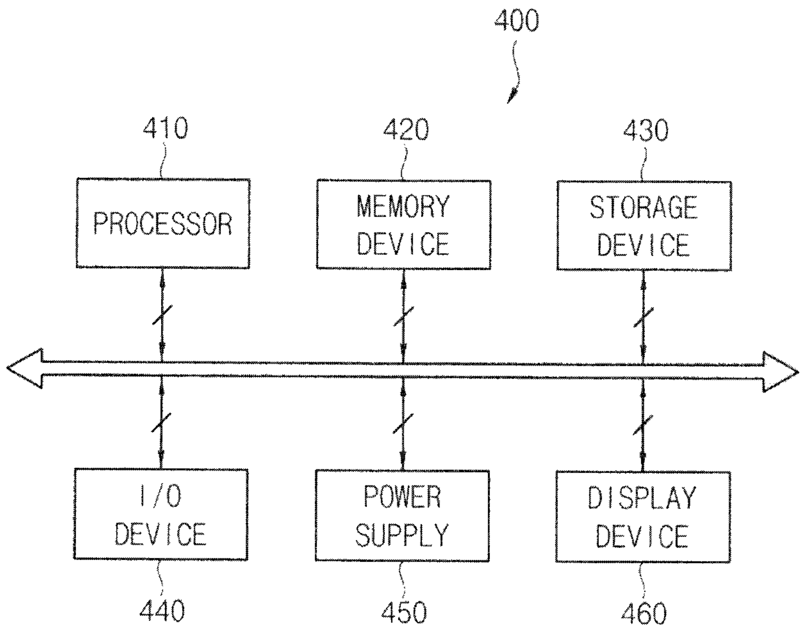
FIG. 5 is a block diagram illustrating an electronic device that includes the organic light emitting display device of FIG. 4.
Figure 6:
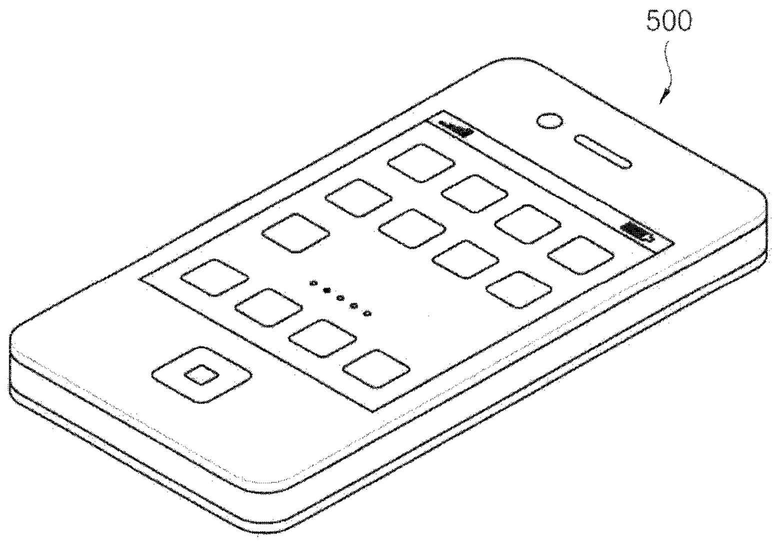
FIG. 6 is a diagram illustrating an example embodiment in which the electronic device of FIG. 5 is implemented as a smart phone.

FIG. 5 is a block diagram illustrating an electronic device that includes the organic light emitting display device of FIG. 4, and FIG. 6 is a diagram illustrating an example embodiment in which the electronic device of FIG. 5 is implemented as a smart phone.

Referring to FIGS. 5 and 6, an electronic device 400 may include a processor 410, a memory device 420, a storage device 430, an input/output (I/O) device 440, a power device/power supply 450, and a display device 460. Here, the display device 460 may correspond to the organic light emitting display device 300 of FIG. 4. In addition, the electronic device 400 may further include a plurality of ports for communicating a video card, a sound card, a memory card, a universal serial bus (USB) device, other electronic devices, etc. Although it is illustrated in FIG. 6 that the electronic device 400 is implemented as a smart-phone 500, the electronic device 400 is not limited thereto.

The processor 410 may perform various computing functions. The processor 410 may be a microprocessor, a central processing unit (CPU), etc. The processor 410 may be coupled to other components via an address bus, a control bus, a data bus, etc. Further, the processor 410 may be coupled to an extended bus, such as peripheral component interconnect (PCI) bus. The memory device 420 may store data for operations of the electronic device 200. For example, the memory device 420 may include at least one non-volatile memory device, such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile DRAM device, etc. The storage device 430 may be a solid stage drive (SSD) device, a hard disk drive (HDD) device, a CD-ROM device, etc.

The I/O device 440 may be an input device, such as a keyboard, a keypad, a touchpad, a touch-screen, a mouse, etc., and may also be an output device, such as a printer, a speaker, etc. In some example embodiments, the display device 460 may be included in the I/O device 440. The power device/power supply 450 may provide a power for operations of the electronic device 400. The display device 460 may communicate with other components via the buses or other communication links. As described above, the display device 460 may include a display panel, a scan driver, a data driver, and a timing controller. The display panel may include a plurality of pixels. Each of the pixels may include an organic light emitting diode, a driving transistor, a first transistor, a storage capacitor, and an initialization block. Further, the pixel may include a second transistor, a third transistor, and a fourth transistor. The driving transistor may be operated when a voltage that is within a dynamic range is provided to a gate electrode of the driving transistor. The initialization block may be coupled to the gate electrode of the driving transistor during a first period. The initialization block may provide a voltage that allows the gate electrode of the driving transistor to be applied under the dynamic range during the first period. Specifically, the initialization block may include a diode coupled between a first node and a fourth node, a second capacitor coupled between the high-power voltage and the fourth node, and a first capacitor coupled between a previous scan line and the fourth node. The scan signal is provided through the previous scan line during the first period. The high-power voltage provided through the high-power voltage line may be applied to the fourth node by being divided based on the first capacitor and the second capacitor during the first period. The voltage of the fourth node may be under the dynamic range. In this case, the diode may be electrically conducted. Thus, the voltage of the first node may be reduced under the dynamic range because the first node and the fourth node are electrically coupled. Here, the first capacitor and the second capacitor may have values that reduce the voltage of the first node under the dynamic range. The scan signal is provided to the gated electrode of the first transistor coupled to the current scan line and the gate electrode of the second transistor coupled to the current scan line during the second period. The data signal provided through the data line may be stored in the storage capacitor by turning on the first transistor and the second transistor during the second period. The driving transistor may generate the driving current based on the data signal stored in the storage capacitor. The organic light emitting diode may emit light based on the driving current. The scan driver may provide the scan signal to the pixels through the scan lines.

The data driver may provide the data signal to the pixels through the data lines in response to the scan signal. The timing controller may generate a control signal that controls the scan driver and the data driver.

As described above, the electronic device 400 may include a display device 460. The display device 460 may include pixels that change the voltage of the first node coupled to the gated electrode of the driving transistor under the dynamic range by electrically coupling the first node to the fourth node of the initialization block. Thus, a pixel layout of the display panel of the organic light emitting display device 460 may be simplified, because the driving transistor included in the pixel is initialized without an initialization power or an initialization power line.

Embodiments of the present inventive concept may be applied to a display device, and an electronic device having the display device. For example, embodiments the present inventive concept may be applied to a computer monitor, a laptop, a digital camera, a cellular phone, a smart phone, a smart pad, a television, a personal digital assistant (PDA), a portable multimedia player (PMP), a MP3 player, a navigation system, a game console, a video phone, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims and their equivalents.

What is claimed is:

1. A pixel of an organic light emitting display device, the pixel comprising:

an organic light emitting diode;

a driving transistor comprising:

a gate electrode coupled to a first node;

a first electrode coupled to a second node; and a second electrode coupled to a third node, the driving transistor being configured to control a driving current through the organic light emitting diode based on a voltage of the first node;

a first transistor coupled between the second node and a data line, the first transistor being configured to be turned on in response to a current scan signal provided through a current scan line;

a storage capacitor coupled between the first node and a high-power voltage line, the storage capacitor being configured to store a voltage corresponding to a difference between a voltage of the high-power voltage line and a voltage of a data signal provided through the first transistor; and an initialization block configured to initialize the first node based on a previous scan signal provided through a previous scan line, the initialization block comprising:

a diode comprising:

an anode electrode coupled to the first node; and a cathode electrode coupled to a fourth node;

a first capacitor coupled between the previous scan line and the fourth node; and a second capacitor coupled between the high-power voltage line and the fourth node.

2. The pixel of claim 1, wherein a high-power voltage is configured to be provided through the high-power voltage line and applied to the fourth node by being divided by the first capacitor and the second capacitor when the previous scan signal is provided through the previous scan line.

3. The pixel of claim 1, wherein a current is configured to flow from the first node to the fourth node through the diode when a voltage level of the first node is higher than a voltage level of the fourth node.

4. The pixel of claim 1, further comprising:

a second transistor coupled between the first node and the third node, the second transistor being configured to be turned on in response to the current scan signal provided through the current scan line, and wherein the second transistor forms a path through which a data signal is configured to be provided through the data line to the storage capacitor.

5. The pixel of claim 1, further comprising:

a third transistor coupled between the high-power voltage line and the second node; and a fourth transistor coupled between the third node and the organic light emitting diode.

6. The pixel of claim 1, wherein a frame of the pixel comprises:

a first period in which the first node is configured to be initialized;

a second period in which the data signal is configured to be provided to the storage capacitor; and a third period in which the organic light emitting diode is configured to emit light.

7. The pixel of claim 6, wherein the driving transistor and the first transistor are configured to be turned off, and the initialization block is configured to be operated, in the first period.

8. The pixel of claim 6, wherein the driving transistor and the first transistor are configured to be turned on, and the initialization block is configured to be not operated, in the second period.

9. The pixel of claim 6, wherein the driving transistor is configured to be turned on, the first transistor is configured to be turned off, and the initialization block is configured to be not operated, in the third period.

10. An organic light emitting display device comprising a display panel comprising a plurality of scan lines, a plurality of data lines, a plurality of pixels at respective crossing regions of the scan lines and the data lines, a scan driver configured to provide scan signals to the pixels, a data driver configured to provide a data signal to the pixels, and a timing controller configured to generate a control signal that is configured to control the scan driver and the data driver, wherein each of the pixels comprises:

an organic light emitting diode;

a driving transistor comprising:

a gate electrode coupled to a first node;

a first electrode coupled to a second node; and a second electrode coupled to a third node, the driving transistor being configured to control a driving current flowing to the organic light emitting diode based on a voltage of the first node;

a first transistor coupled between the second node and the data line, the first transistor being configured to be turned on in response to a current scan signal provided through a current scan line of the scan lines;

a storage capacitor coupled between the first node and a high-power voltage line, the storage capacitor being configured to store a voltage corresponding to a difference between a voltage of the high-power voltage line and a voltage of the data signal provided through the first transistor; and an initialization block configured to initialize the first node based on a previous scan signal provided through a previous scan line of the scan lines, the initialization block comprising:

a diode comprising:

an anode electrode coupled to the first node; and a cathode electrode coupled to a fourth node;

a first capacitor coupled between the previous scan line and the fourth node; and a second capacitor coupled between the high-power voltage line and the fourth node.

11. The display device of claim 10, wherein a high-power voltage is configured to be provided through the high-power voltage line and applied to the fourth node by being divided by the first capacitor and the second capacitor when the previous scan signal is provided through the previous scan line.

12. The display device of claim 10, wherein a current is configured to flow from the first node to the fourth node through the diode when a voltage level of the first node is higher than a voltage level of the fourth node.

13. The display device of claim 10, wherein each of the pixels further comprises:

a second transistor coupled between the first node and the third node, the second transistor being configured to be turned on in response to the current scan signal provided through the current scan line, and wherein the second transistor forms a path through which the data signal provided through a corresponding one of the data lines is provided to the storage capacitor.

14. The display device of claim 10, wherein each of the pixels further comprises:

a third transistor coupled between the high-power voltage line and the second node; and a fourth transistor coupled between the third node and the organic light emitting diode.

15. The display device of claim 10, wherein a frame of each of the pixels comprises:

a first period in which the first node is configured to be initialized;

a second period in which the data signal is configured to be provided to the storage capacitor; and a third period in which the organic light emitting diode is configured to emit light.

16. The display device of claim 15, wherein the driving transistor and the first transistor are configured to be turned off, and the initialization block is configured to be operated, in the first period.

17. The display device of claim 15, wherein the driving transistor and the first transistor are configured to be turned on, and the initialization block is configured to be not operated, in the second period.

18. The display device of claim 15, wherein the driving transistor is configured to be turned on, the first transistor is configured to be turned off, and the initialization block is configured to be not operated, in the third period.

* * * * *